United States Patent
Baumgarten et al.

(10) Patent No.: US 8,340,862 B2
(45) Date of Patent: Dec. 25, 2012

(54) AGRICULTURAL WORKING VEHICLE AND DISPLAY UNIT THEREFOR

(75) Inventors: Joachim Baumgarten, Beelen (DE);
Werner Fitzner, Sassenberg (DE);
Sebastian Neu, Bad Laer (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 459 days.

(21) Appl. No.: 12/706,038

(22) Filed: Feb. 16, 2010

(65) Prior Publication Data
US 2010/0217481 A1  Aug. 26, 2010

(30) Foreign Application Priority Data
Feb. 20, 2009  (DE) .......................... 10 2009 009 817

(51) Int. Cl.
*A01D 41/127* (2006.01)
*G06F 19/00* (2006.01)

(52) U.S. Cl. ......................... 701/33.4; 701/50; 56/10.2 R
(58) Field of Classification Search .................... 701/35, 701/50; 56/10.2 R; 340/438
See application file for complete search history.

(56) References Cited

U.S. PATENT DOCUMENTS

| | | | | |
|---|---|---|---|---|
| 5,361,059 A | * | 11/1994 | Hoffman et al. | 340/438 |
| 6,282,476 B1 | * | 8/2001 | Hieronymus et al. | 701/50 |
| 7,630,808 B2 | * | 12/2009 | Behnke et al. | 701/50 |
| 8,161,718 B2 | * | 4/2012 | Bussmann et al. | 56/10.2 G |
| 2008/0288144 A1 | * | 11/2008 | Jeppe et al. | 701/50 |

\* cited by examiner

*Primary Examiner* — Tan Q Nguyen
(74) *Attorney, Agent, or Firm* — Michael J. Striker

(57) ABSTRACT

A display unit is provided in an agricultural working vehicle to display at least one operating parameter of the working vehicle, so that it is possible to change the operating parameter as a function of one or more setting parameters of the working vehicle. The display unit is designed to display a change in the operating parameter resulting from a change made to at least one of the setting parameters.

17 Claims, 3 Drawing Sheets

AGRICULTURAL WORKING VEHICLE AND DISPLAY UNIT THEREFOR

CROSS-REFERENCE TO A RELATED APPLICATION

The invention described and claimed hereinbelow is also described in German Patent Application DE 10 2009 009 817.8 filed on Feb. 20, 2009. This German Patent Application, whose subject matter is incorporated here by reference, provides the basis for a claim of priority of invention under 35 U.S.C. 119(a)-(d).

BACKGROUND OF THE INVENTION

The present invention relates to a display unit for an agricultural working vehicle, and to an agricultural working vehicle, in particular a combine harvester in which a display unit of this type is used.

Agricultural working vehicles, e.g., tractors, combine harvesters, forage harvesters, etc., typically include a large number of working units, the setting parameters of which may be influenced by an automatic control or via an input made in an operating element by an operator. In modern agricultural working machines, the functionality and/or working result of individual working units or a plurality of interacting working units depends substantially on making a correct determination regarding the setting parameters of the individual working units. Complex interactions take place between the individual units, and they affect the working result. The correlation between setting parameters of the units and the working result is complicated and often non-linear, and so it is difficult for automatic control and for a trained operator to estimate in a specific case how a change that was made to one or more setting parameters of the working machine will affect the working result.

Compounding this difficulty is the fact that, in many cases, the change made to the setting parameter affects the working result only after a considerable time delay which may not be the same under all conditions. Although computer-assisted models of the working sequences in the working machine may help an operator to estimate the effect of a change to an setting parameter in advance, a model of this type is unable to deliver an exact prognosis until all relevant basic conditions are known with sufficient accuracy.

If this is not the case, the model-assisted prognosis may even be counterproductive, since, when the operator of the machine sees the results of the prognosis in the display, this may prevent the operator from changing a parameter, even though, in reality, doing so would be entirely suitable in order to improve the working result.

Regardless of whether an operator determines the setting parameter, or whether an automatic control system does this based on a computer-assisted model, the operator must check to determine whether the selected setting parameter values lead to a satisfactory working result. To make it possible for the operator to do this, operating parameters that are representative of the quality of the working result must be shown to him in a manner that is transparent and reduced to the essential information.

SUMMARY OF THE INVENTION

The object is attained by the fact that a display unit for an agricultural working vehicle, which is used to display at least one operating parameter of the working vehicle which may be changed as a function of one or more setting parameters of the working vehicle, is designed to display a change in the operating parameter (q) resulting from a change made to at least one of the setting parameters ($EP_i$).

When the display unit is designed to depict the change in the operating parameter by simultaneously depicting a value of the operating parameter before the change ($q_{old}$) and a value of the operating parameter after the change ($q_{actual}$) the operator may relate the change directly to the magnitude of the operating parameter and thereby better assess the relevance of a change.

A change tendency of the operating parameter may be visualized by the fact that a figure that is assigned to the operating parameter and is shown in the display element assumes two discrete values of a given property depending on the sign of the change. Preferably, this property is the color or a pattern of the second subfigure. A worsening of the operating parameter may therefore be made clear to the operator in an intuitive manner by depicting the second subfigure in red, and by depicting an improvement in green.

Furthermore, given that a dimension of the figure is representative of the magnitude of the change made to the operating parameter, it is also possible to rapidly evaluate the extent of the change.

By displaying a second figure, the dimension of which is representative of a value of the operating parameter that is preferably the smaller of the two, the operator is able to assess the change to the operating parameter relative to its magnitude.

The dimension may be a length; then it is advantageous to display the figures next to one another in the display unit in the direction of the length, and so the total length of the two figures corresponds to the greater of the two values of the operating parameter.

A surface area of the figures may also be a dimension. The figures are then advantageously depicted next to one another in the display unit, and so the common outline of the two figures corresponds to the greater of the two values of the operating parameter. To simplify the comparison of the two values, the common outline of the two figures is advantageously similar to the second figure.

To ensure that the displayed change to the operating parameter may be updated continually, the control unit is advantageously connected to at least one sensor that delivers measured values of the operating parameter, or at least values that make it possible to calculate the operating parameter in real time.

Advantageously, a value to be adjusted for at least one setting parameter of the vehicle which influences the operating parameter may be entered by the operator using an operating element, and the display unit is designed to display the change to the operating parameter that results from a change made to the at least one setting parameter that was entered using the operating element. In this manner, whenever the operator starts to optimize the operating parameter, a suitable reference value for the depiction of the change is automatically obtained.

Advantageously, the display unit includes a memory element for storing the value of the operating parameter that exists at the instant when the change to the setting parameter was entered using the operating element.

Preferably, the display unit is also designed to implement a change to a setting parameter on a working unit of the working vehicle. If it also stores an original value of the setting parameter that applied before the change, it may restore this original value in response to a reset command issued by the operator. It is therefore not necessary for the operator himself to take note of the original value of every modified setting parameter in order to subsequently restore it in a quantitative manner whenever necessary; it is sufficient for the operator to simply enter the request after the starting state is restored, regardless of which setting parameters correspond to this.

Preferably, the display unit is designed to implement the change to the setting parameter in accordance with an input made using the operating element.

If the operator has not cancelled a setting parameter change after a certain period of time, it may be assumed that he wants to keep it. In this case, or in response to an express command issued by the operator, it is advantageous that the display unit replaces the stored value of the setting parameter with the changed value, thereby enabling the latter to be restored if a subsequent, new change is unsuccessful.

If the value of the operating parameter has been stored, a block in the control unit advantageously prevents this parameter from being stored once more for a predefined period of time, or until the operator enters a release command. This block makes it possible for the operator to vary several setting parameters within the predefined time period so that he may observe the effect of a combined change of this type on the operating parameter. In this case, a reset command issued by the operator advantageously affects all stored setting parameter values, thereby ensuring that all of the setting parameters that have resulted in the stored value of the operating parameter may be restored exactly in a case such as this. Advantageously, the operator issues a release command when a change in the setting parameter has resulted in an improvement of the operating parameter, and when the resultant new value of the operating parameter should be used as a reference for purposes of further optimization.

The subject matter of the present invention is furthermore an agricultural working vehicle, in particular a combine harvester, having a display unit of the type described above.

In the case of a combine harvester, a working unit to which one or more setting parameters relate may be a concave, a screen, or a cleaning fan, and the setting parameters may be the concave width, sieve width, or fan output. The operating parameters include, in particular, parameters that are representative of the working quality of the working vehicle, such as the harvest output, or, in the case of a combine harvester, grain loss, portion of damaged grain, and tailings quantity.

Further features and advantages of the present invention result from the description of exemplary embodiments that follows, with reference to the attached figures.

DESCRIPTION OF THE PREFERRED EMBODIMENTS

Figure 1:
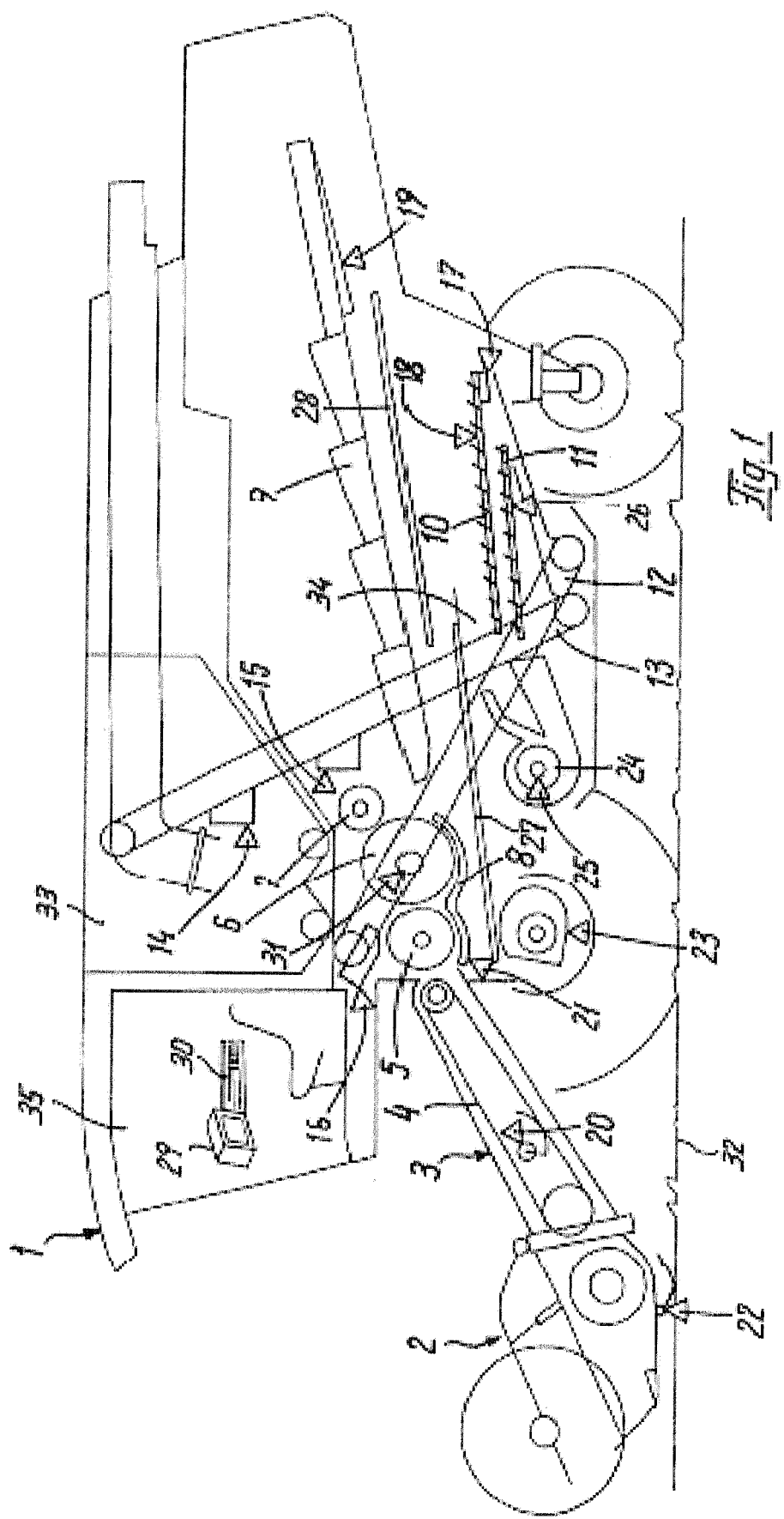
FIG. 1 shows a schematic side view of a combine harvester.

A schematicized side view of an agricultural working vehicle designed as a combine harvester 1 is shown in FIG. 1, as an example. The task of a combine harvester 1 is to pick up the crop material growing on stalks from an area being harvested 32 and separate it from the straw and other admixtures. A grain cutting device 2, which is used to pick up the crop material, is shown in FIG. 1 as an example. It cuts the crop stalks containing the crop material in the ears out of area being harvested 32 and combines them across the width of feeder 3, which performs the intake function. Located in feed rake 3 are rotating feed chains 4 with transverse segments that convey the crop material to downstream threshing units 5, 6.

The crop material is removed by preacceleration cylinder 5 at the end of feed rake 3 and is accelerated around the circumference of preacceleration cylinder 5 between preacceleration cylinder 5 and concave 8. The accelerated crop material is then transferred to cylinder 6. The crop material is separated from the ears and straw via the striking and rubbing effect of preacceleration cylinder 5 and cylinder 6, and via the centrifugal force acting on the crop material. The crop material then travels through concave 8, which allows the crop material to pass, and reaches grain pan 27. The straw output by cylinder 6 is halted by impeller 7 and redirected to several shakers 9 located next to one another across the working width. The oscillating motion of shakers 9 and their stepped design cause the straw to be conveyed to the back end of the combine harvester, thereby removing any crop material remaining in the straw. This remaining quantity is also transferred to grain pan 27, via an oscillating return pan 28.

The crop material with the remaining admixtures, e.g., straw pieces, chaff and ear pieces, located on grain pan 27 is separated via an oscillating motion of grain pan 27 and its stepped design, and is conveyed to downstream cleaning units 10, 11, 24. The transfer to upper sieve 10 takes place via a straw walker step 34 which is ventilated by cleaning fan 24. Upper sieve 10 and lower sieve 11 located below it are usually chaffers having separately-adjustable opening widths; upper sieve 10 may have an opening-width setting in a rear region that differs from that in its front region. A flow of air created by cleaning fan 24 passes through upper sieve 10 and lower sieve 11. The oscillating motion of sieves 10, 11 and the air flow cause the crop material and its admixtures to be directed toward the back end of the harvesting machine.

By way of straw walker step 34, large and lightweight admixtures are captured by the air flow before they reach upper sieve 10 and are ejected out of combine harvester 1. Smaller and heavier crop components travel from grain pan 27 via straw walker step 34 to upper sieve 10. Depending on the setting of the upper sieve width, the individual crop grains and further components of the crop material fall through it, thereby reaching lower sieve 11. Straw and non-threshed-out ears are moved past the front sieve area and, in the rear region of upper sieve 10, fall through upper sieve 10 directly into the "tailings".

Lower sieve 11 typically has a finer plate structure than does upper sieve 10, and normally has a smaller opening width setting than does upper sieve 10. Larger and lighter-weight crop components, such as crop grains with husks, ear parts, or stalk parts—provided they have traveled through upper sieve 10 and reached lower sieve 11—are transferred via the oscillating motion and air flow into the tailings. The cleaned crop material itself falls directly through lower sieve 11 and is conveyed to a grain tank 33 using a feed auger and a grain elevator 13. The crop material that reaches the tailings is returned to the threshing process via a feed auger and tailings elevator 12 above preacceleration cylinder 5.

Combine harvester 1 is equipped with a driver's cab 35, in which a display screen 29 and a control unit 30 having an integrated memory unit are located. Devices for specifying the driving direction and ground speed of combine harvester 1 are also provided, although they are not shown and they are known to a person skilled in the art. Display screen 29 and control unit 30 are connected to individual sensors and actuators located at various points in combine harvester 1. They allow the operator of combine harvester 1 to adjust and monitor the setting parameters of the individual working units and, therefore, the functionality of combine harvester 1. In FIG. 1, arrows point to the different locations in combine harvester 1 where a sensor used to determine process and setting parameters is installed. The particular actuators used to adjust combine harvester 1, such as adjusting the gap width of concave 8 and sieves 10, 11, the distance between preacceleration cylinder 5 and concave 8, and/or concave 8 and cylinder 6, the rotating speed of cylinders 6, 6, 7, and the output of cleaning fan 24 are sufficiently known to a person skilled in the art, thereby making it possible to forgo the depiction of the particular element in FIG. 1.

A ground-speed measuring device 23 that detects the particular ground speed is located on the drive axle of combine harvester 1.

A cutting-height measuring device 22 is assigned to header 2. Device 22 is used to determine the actual distance between header 2 and area being harvested 32. The sensed value may be displayed to the operator using display unit 29, and may also be used as the actual value for the automatic regulation of cutting height.

A crop-quantity measuring device 20 is installed in feed rake 3 to detect the harvested quantity. It determines the deflection of a feed chain 4, which is a function of the crop-material quantity.

A further sensor system is mounted on concave 8. Concave-width measuring device 21 is provided singly or in plurality, and determines the distance between preacceleration cylinder 5 and concave 8 and/or cylinder 6 and concave 8 at one or more points.

Preacceleration cylinder 5, cylinder 6, and impeller 7 are usually driven by a common drive, it being possible to vary the speeds of cylinders 5, 6, 7 using a servo drive. A cylinder-speed measuring device 31 for detecting at least one of the cylinder speeds is assigned to cylinders 5, 6, 7.

To produce air flows of different intensities through the cleaning device, the drive of cleaning fan 24 has a variable-speed design. The actual speed of cleaning fan 24 is detected using a cleaning-fan measuring device 25.

Additional sensors may be assigned to the cleaning device. In this manner, the particular sieve opening width may also be detected using an upper-sieve width measuring device 18 and a lower-sieve width measuring device 26. Measuring devices 18, 26 may be part of the particular not-shown adjusting device, or they may be separate therefrom, and they may be located on sieve 10, 11. An upper-sieve loss measuring device 17 is located on the back end of upper sieve 10. This device is used to detect the portion of crop grains that leave combine harvester 1 via the cleaning device and that are considered to be losses. Sensors of this type are known to a person skilled in the art and extend across part or all of the working width of the cleaning device. They are normally designed as a baffle plate or tube and evaluate the oscillations that are produced by the impact of crop grains on the plate or tube.

This sensor technology may also be used and located at any other point in a combine harvester 1. This sensor technology allows flows of crop grains to be detected and makes it possible to make a determination—that is comparative and relative, at the least—of the quantities of grain present at a particular site. This sensor technology is also used in shakers 9 to detect separation. To obtain a determination of the amount of crop grains remaining in the straw, a shaker-loss sensor 19 is attached at least to the back end of a shaker 9. Sensor 19 detects the portion of crop grains separated at the end of shaker 9. In order to also evaluate the quantity of crop grains in the tailings, a baffle plate sensor system of this type may also be located at the end of lower sieve 11 or at the point at which the tailings are returned to the threshing process.

To evaluate the crop components located in the tailings, a tailings-measuring device 16 is located on the upper end of tailing elevator 12. It is used to determine the tailings volume, the portion of grain, and the portion of damaged grain. Optical light barriers, optical sensors, or transillumination sensors (NIR sensors) are known for use for this purpose.

Grain elevator 13 is equipped with further sensors 14, 15 which serve to determine the quantity conveyed through a yield-measuring system 14 and to determine the specific weight of the crop material using a calibration scale 15.

As indicated above in the description of the functionality of combine harvester 1, the operator of combine harvester 1 has a large number of options for influencing setting parameters of the individual working assemblies.

A "working unit" in the sense of the present invention refers to all components and/or control elements of an agricultural working vehicle that perform a certain function to attain a working result of the working machine. Using the aforementioned example of combine harvester 1 as an example, these working units may be, e.g., grain-cutting device 2, feed rake 3, feed chains 4, preacceleration cylinder 5, cylinder 6, impeller 7, concave 8, shaker 9, upper sieve 10, lower sieve 11, tailings elevator 12, grain elevator 13, cleaning fan 24, grain pan 27, and/or return pan 28. A group of interacting individual working units is referred to as a working unit in the context of the present invention. This may be, e.g., the cleaning device of combine harvester 1 that is composed of upper sieve 10, lower sieve 11, and cleaning fan 24.

The different sensors and measuring systems located in the working machine are also considered to be working units in the context of the present invention, i.e., yield-measuring system 14, calibration scale 15, tailings-measuring device 16, upper-sieve loss measuring device 17, upper-sieve width measuring device 18, shaker-loss sensor 19, crop-quantity measuring device 20, concave-width measuring device 21, cutting-height measuring device 22, ground-speed measuring device 23, cleaning fan-measuring device 25, lower-sieve width measuring device 26, and/or cylinder-speed measuring device 31.

In the sense of the present invention, "setting parameters" refer to any variables or properties of the agricultural machines or its working units which the operator may directly influence individually or linked to other variables, in particular those variables or properties to which a regulator is assigned on control unit 30. Setting parameters of primary consideration are continually variable quantities such as a rotating speed, e.g., of one of the cylinders 5, 6, 7 or cleaning fan 24, a frequency, e.g., of straw walker 9, sieve 10, 11, or pans 27, 28, and/or a speed, and/or a distance, and/or a pressure, and/or a crop material throughput quantity of a working unit, to mention just a few examples. The quantities may also be discrete, e.g., the "on" or "off" state of an ancillary unit, etc.

Preferably, "operating parameters" refers to those parameters that are not unambiguously correlated with the value of an individual setting parameter, but rather that may be influenced using various setting parameters. In this case, those parameters are considered in particular, the value of which is related to the quality of the work product and/or to the economic yield of the work performed by the working vehicle, such as the cleanliness of the crop material, the portion of damaged grain, crop material losses at straw walker 9 or at upper sieve 10, tailings quantity, etc. Operating parameters may also be quantities derived from the quantities described above, with consideration for basic external economic conditions, such as sales proceeds based on the current purchase price of the crop material depending on the cleanliness and portion of damaged grain, or a net profit derived from these sales proceeds with consideration for machine operating costs and personnel costs.

An "operator", in the sense of the present invention, is the individual or a plurality of individuals who may influence the setting parameters of the working units of an agricultural working vehicle, and to whom a measured value of one or more operating parameters is displayed. This may be the driver of the agricultural working vehicle himself and/or a driver of another agricultural working vehicle who is authorized to access—via suitable transmission means—the control unit of the working vehicle to be adjusted, and/or a further group of individuals, e.g., a land manager working on his farm-based computer, who communicates—via suitable transmission means—with the control unit of the working vehicle to be adjusted. This list of possible operators is only an example and should not be considered final.

For simplicity, it shall be assumed below that the operator is the driver of combine harvester 1, and that control unit 30 is the control unit according to the present invention. An implementation, in which, e.g., the farm-based computer functions as the control unit, is obvious to a person skilled in the art based on the explanations that follow.

Figure 2:
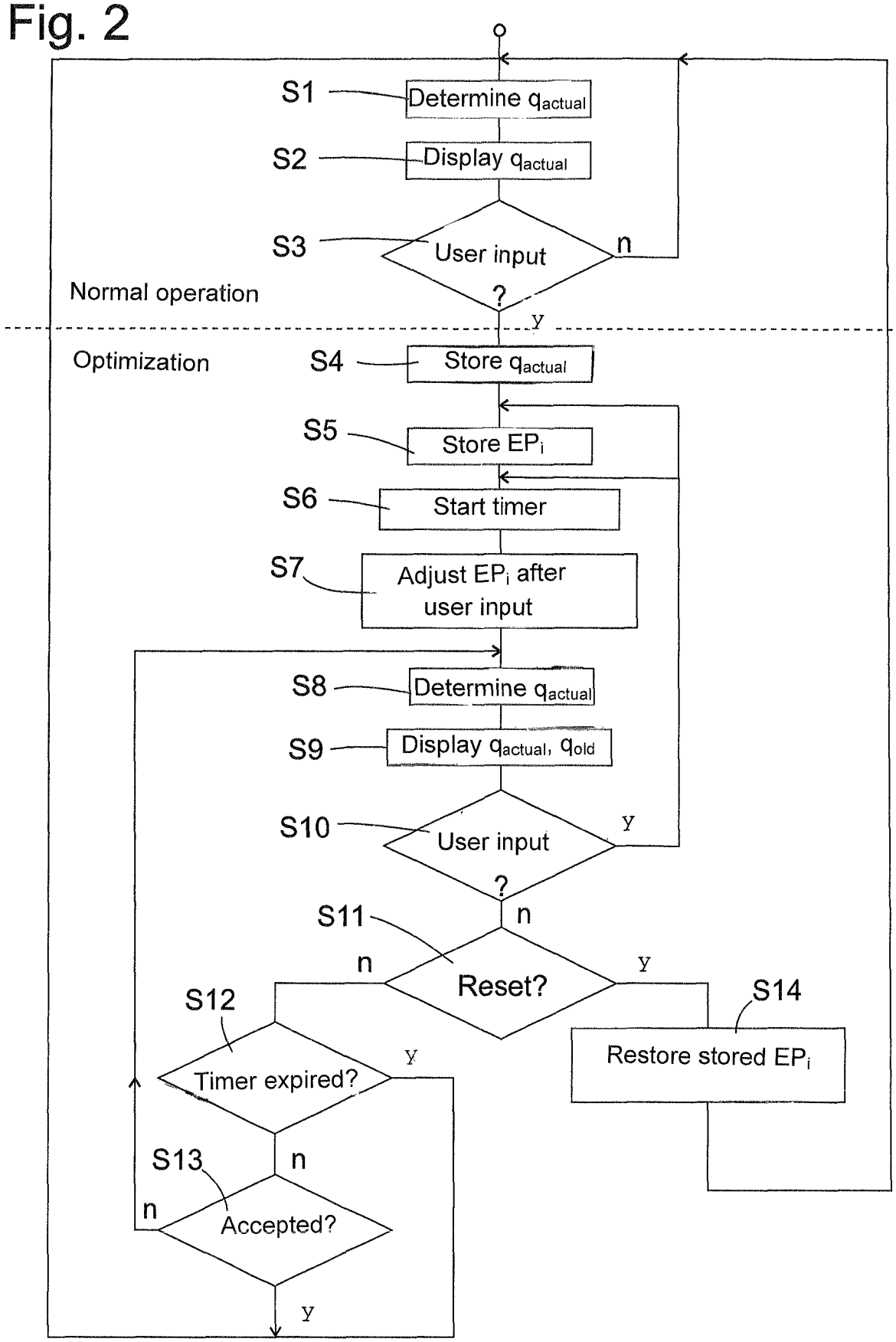
FIG. 2 shows a flow chart that illustrates the mode of operation of the display unit.

FIG. 2 shows a flow chart of an operating procedure that takes place in control unit 30. An initial step S1 of the cyclical procedure is the determination of current value $q_{ist}$ of an operating parameter q. The determination may be a direct measurement via a sensor, e.g., one of the sensors 14 through 17 or 19, or it may be a calculation based on the results of this and possibly further sensors, and on any external basic conditions such as purchase prices, fuel costs, etc. The result of the calculation is displayed to the driver on a display screen 29 in step S2. The driver has the option to optimize operating parameter q by varying various setting parameters $EP_1, \ldots, EP_n$ on the regulator of control unit 30. If he does not do this, control unit 30 remains in a normal operating mode in which steps S1, S2 and a step S3 of checking whether the driver has entered a request to change a setting parameter are repeated in a cyclical manner.

If control unit 30 detects, in step S3, that the driver has entered a request to change any setting parameter $EP_i$, i=1, 2, . . . , n, it switches to an optimization operating mode in which it initially stores, in step S4, current value $q_{ist}$ of operating parameter q in the integrated memory unit. Next, in step S5, the current value of setting parameter $EP_i$, which the driver wants to change, is stored. In step S6, a timer is started which marks a time interval, the duration of which is a multiple of the time that combine harvester 1 requires after a setting parameter has been changed to return to a stationary operating mode in which the values measured by its various sensors correctly reflect the current settings of the various setting parameters.

In step S7, control unit 30 activates an actuator assigned to selected setting parameter $EP_i$ in order to set it to the value selected by the driver. Finally, current value $q_{actual}$ of operating parameter q is determined, as in step S1. In step S9, value $q_{ist}$ of parameter q determined in step S8, and its value $q_{old}$ stored in step 4 are displayed on display screen 29. In step S10, control unit 30 checks to determine whether a new operator input exists regarding the same setting parameter $EP_i$ or another setting parameter. If the input relates to the same setting parameter $EP_i$, the procedure returns to step S6; if another setting parameter EPS exists, it returns to step S5, to store the current value of this parameter as well. (As an alternative, when switching to the optimization operating mode in step S5, all setting parameters $EP_1, \ldots, EP_n$ could be stored; it would then be possible, in step S10, for the procedure to always return to step S6 whenever a change is made, regardless of which setting parameter was changed.)

If the driver has not entered a request that refers specifically to a setting parameter, a check is carried out in step S11 to determine whether the driver may have actuated a reset button on control unit 30. If the reset button has not been actuated, and it is also determined in step S12 that the timer has not yet expired, the procedure checks in step S13 to determine whether an "accept" button on control unit 30 has been actuated. If this has not been actuated, either, the procedure returns to step S8. Given that steps S8 through S13 are run through periodically in this manner, the driver is continually shown the current values of parameter q which gradually change as a result of the change made to the setting parameter.

Based on a comparison of displayed values q, $q_{old}$, the driver may decide whether his input has resulted in an improvement to operating parameter q or not. If so, the driver will keep the change made to setting parameter $EP_i$. In this case, he does not need to do anything else, since, as soon as it is determined in step S12 that the timer has expired, control unit 30 automatically returns to the normal operating mode, to step S1. The driver also has the option of actuating the "accept" button in order to indicate that he wants to keep the change made to setting parameter $EP_i$. If control unit 30 detects this in step S13, it returns to step S1 even before the timer expires. If the driver now makes a new change to the same setting parameter or to a different setting parameter, the value of operating parameter q attained at the point in time when this new change was made is stored by performing step S4 once more, and it may be used as a measure of comparison for further changes.

It is often not sufficient to change an individual setting parameter in order to actually attain an improvement to an operating parameter. In this case, the driver will generally change several setting parameters $EP_i, EP_j, \ldots$ in rapid succession, in each case before the timer expires, and without actuating the "accept" button. In this case, the sequence of steps described above ensures that all values that had the changed setting parameters $EP_i, EP_j, \ldots$ before the optimization operating mode was started remain stored. If, after a plurality of setting parameters has been changed, the driver determines that he was unable to improve q, it is sufficient to actuate the reset button. When control unit 30 detects this in step S11, it restores all previously stored values of changed setting parameters $EP_i, EP_j, \ldots$ in step S14, thereby restoring the state that existed before the optimization attempt started.

Figure 3A:
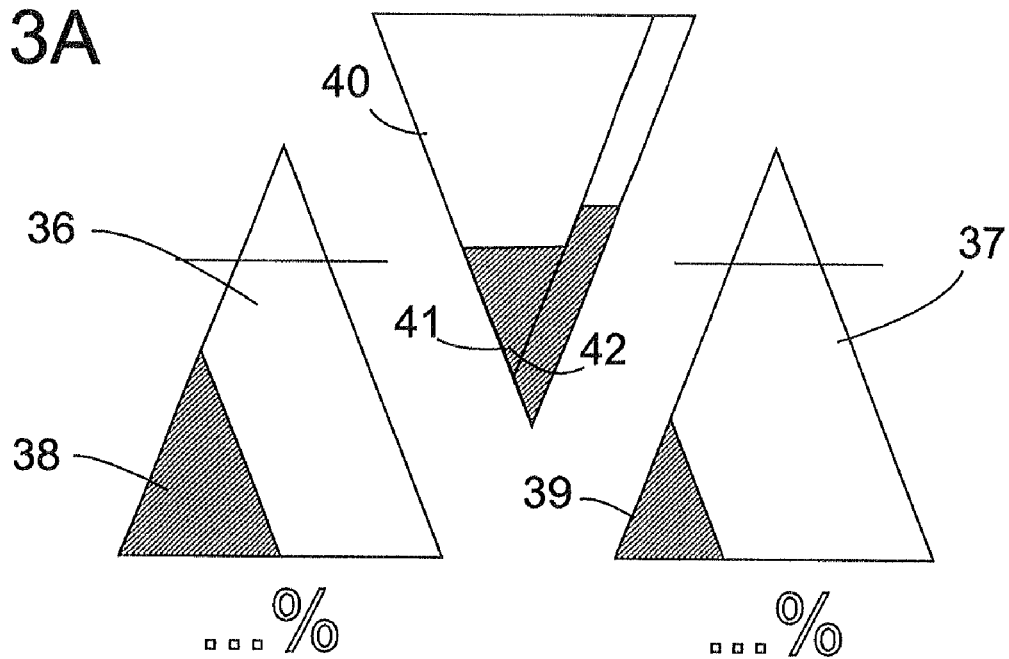
FIGS. 3a and 3b show display images in a screen of the display unit in a normal operating mode and in an optimization operating mode.

FIG. 3a shows an example of an image that is displayed to the driver on display screen 29 in the normal operating mode. Light-colored triangles 36, 37 are display fields for grain losses detected by shaker-loss sensor 19 and upper-sieve loss measuring device 17, as examples of operating parameters of combine harvester 1. The area of a black triangle 38 or 39 shown in the lower left-hand corner of triangles 36, 37 is proportional to the actual losses that are currently measured. In a further display field 40, a black triangle 41 represents a tailings volume detected by tailings-measuring device 16, and a black bar 42 next to it represents the tailings mass.

Figure 3B:
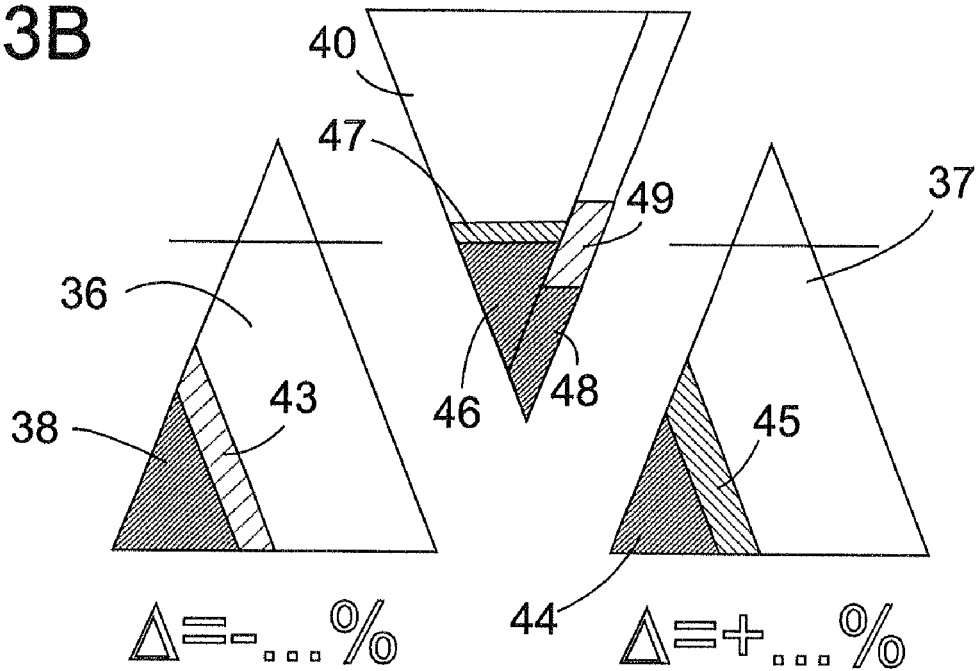

FIG. 3b shows an image displayed on display screen 29 which may result in the optimization operating mode, based on the values shown in FIG. 3a for grain losses, tailings volume, and the tailings mass, from the change made to one or more setting parameters. An improvement was made in terms of shaker losses. Black triangle 38, which represents the current value of the shaker loss, is reduced in size, and a bar 43 adjacent thereto is shown in green in order to visualize the progress. The dark triangle and bar 43 both fill the same area as triangle 38 shown in FIG. 3a. That is, the greater the improvement, the more green there is to see.

The upper-sieve loss has worsened. Black triangle 44 in FIG. 3b covers the same area as triangle 39 in FIG. 3a, and the increase in the loss rate is symbolized by an adjacent bar 45 shown in red. The combined areas of triangle 44 and bar 45 represents the current value of the upper-sieve loss.

Changes may also be depicted as numerical values, in percentages, or percentage points, in which case a negative sign for a shaker loss means that the losses have decreased, and a positive sign for the upper sieve loss means it has increased.

A related display scheme is also used for the tailings parameters: Next to a black triangle 46 that has the same surface area as triangle 41 in FIG. 3a, a red bar 47 indicates that the tailings volume has increased. At the same time, however, the tailings mass was reduced, so black field 48 in FIG. 3b is smaller than bar 42 in FIG. 3a, and field 48 and an adjacent field 49 shown in green together comprise the area of bar 42. It is therefore possible for the driver to recognize, in one glance and based on the colors shown in display field 29, whether a parameter change is advantageous and should be retained, or whether further changes are necessary, or whether the optimization attempt should be halted.

It will be understood that each of the elements described above, or two or more together, may also find a useful application in other types of constructions differing from the types described above.

While the invention has been illustrated and described as embodied in an agricultural working vehicle and display unit therefor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A display unit for an agricultural working vehicle, for displaying at least one operating parameter of the working vehicle which is changeable as a function of one or more setting parameters of the working vehicle, wherein the display unit is configured to display a change in the operating parameters resulting from a change made to at least one of the setting parameters, wherein the display unit is configured to depict the change in the operating parameter by simultaneously depicting a value of the operating parameter before the change and a value of the operating parameter after the change, wherein the display unit is configured to display a first figure, one dimension of which is representative of a magnitude of the change to the operating parameter, and one property of which assumes two discrete values depending on a sign of the change to the operating parameter.

2. The display unit as defined in claim 1, wherein the display unit is designed so that the property is a color or a pattern of a second subfigure.

3. The display unit as defined in claim 1, wherein the display unit is configured so as to display a second figure, a dimension of which is representative of a smaller of the above-referenced values.

4. The display unit as defined in claim 3, wherein the display unit is configured so that the dimension is a length of the figures, and the figures are displayed next to one another in the display unit in a direction of a length.

5. The display unit as defined in claim 3, wherein the display unit is designed so that the dimension is an area of the figures, and the figures are displayed next to one another in the display unit.

6. The display unit as defined in claim 5, wherein the display unit is configured so that a common outline of the two figures is similar to the second figure.

7. The display unit as defined in claim 1, further comprising at least one sensor connected to the display unit for determining a current value of the operating parameter to continuously update the displayed change in the operating parameter based on the current value of the operating parameter that was determined.

8. The display unit as defined in claim 1, further comprising an operating element connected to the display unit and arranged so that an operator can enter into the operating element a value for at least one setting parameter of the vehicle that influences the operating parameter to display the change to the operating parameter that results from a change to the at least one second parameter that was entered using the operating element.

9. The display unit as defined in claim 8, further comprising a memory element for storing a value of the operating parameter that exists at an instant when the change to the setting parameter was entered using the operating element.

10. The display unit as defined in claim 8, wherein the display unit is configured to implement the change in the setting parameter in accordance with an input made in the operating element.

11. The display unit as defined in claim 1, wherein the display unit is furthermore configured to implement a change to a setting parameter on a working unit of the working vehicle, to store an original value of the setting parameter that applied before the change was made, and in response to receiving a reset comment, cancels the change in the setting parameter on the working unit.

12. The display unit as defined in claim 11, wherein the display unit is configured furthermore to replace the stored value of the setting parameter with the changed value in response to a command from the operator or after a waiting period has expired.

13. The display unit as defined in claim 1, wherein the display unit is configured so that once the value of the operating parameter has been stored, this value is blocked from being stored once more during a predefined time period or until an operator has entered a release command.

14. An agricultural working vehicle, comprising a display unit for displaying at least one operating parameter of the working vehicle which is changeable as a function of one or more setting parameters of the working vehicle, wherein the display unit is configured to display a change in the operating parameters resulting from a change made to at least one of the setting parameters, wherein the display unit is configured to depict the change in the operating parameter by simultaneously depicting a value of the operating parameter before the change and a value of the operating parameter after the change, wherein the display unit is configured to display a first figure, one dimension of which is representative of a magnitude of the change to be the operating parameter, and one property of which assumed two discrete values depending on a sign of the change to the operating parameter.

15. The agricultural working vehicle as defined in claim 14, wherein the agricultural working machine is a combine harvester.

16. The agricultural working vehicle as defined in claim 15, wherein the agricultural working machine has at least one working unit selected from the group consisting of a cylinder, a concave, a sieve and a cleaning fan, and said display unit is configured so that one or more setting parameters is/are referred to the at least one working unit and the setting parameter is a parameter selected from the group consisting of a cylinder speed, a concave width, a sieve width and a fan power.

17. The agricultural working vehicle as defined in claim 14, wherein the display unit is configured so that the operating parameter is a parameter selected from the group consisting of a harvest yield, a grain loss, a portion of damaged grain, and a tailings quantity.

* * * * *